US012784188B2

(12) United States Patent
Tahvilian et al.

(10) Patent No.: US 12,784,188 B2
(45) Date of Patent: Nov. 3, 2026

(54) SYSTEMS AND METHODS FOR DESIGNING ACCURATE FLUORESCENCE IN-SITU HYBRIDIZATION PROBE DETECTION ON MICROSCOPIC BLOOD CELL IMAGES USING MACHINE LEARNING

(71) Applicant: LungLife AI, Inc., Thousand Oaks, CA (US)

(72) Inventors: Shahram Tahvilian, Tarzana, CA (US); Lara Baden, Woodland Hills, CA (US); Daniel Gramajo-Leventon, Northridge, CA (US); Rebecca Reed, Sherman Oaks, CA (US); Bhushan Garware, Pune (IN); Chinmay Savadikar, Pune (IN); Anurag Palkar, Pune (IN); Paul Pagano, Moorpark, CA (US)

(73) Assignee: LungLife AI, Inc., Thousand Oaks, CA (US)

( * ) Notice: Subject to any disclaimer, the term of this patent is extended or adjusted under 35 U.S.C. 154(b) by 786 days.

(21) Appl. No.: 17/788,525

(22) PCT Filed: Dec. 23, 2020

(86) PCT No.: PCT/US2020/066959
§ 371 (c)(1),
(2) Date: Jun. 23, 2022

(87) PCT Pub. No.: WO2021/133984
PCT Pub. Date: Jul. 1, 2021

(65) Prior Publication Data

US 2023/0041229 A1 Feb. 9, 2023

Related U.S. Application Data

(60) Provisional application No. 62/952,914, filed on Dec. 23, 2019.

(51) Int. Cl.
*G06T 7/00* (2017.01)

(52) U.S. Cl.
CPC .. *G06T 7/0012* (2013.01); *G06T 2207/20084* (2013.01); *G06T 2207/30024* (2013.01);
(Continued)

(58) Field of Classification Search
CPC ......... G06T 7/0012; G06T 2207/20084; G06T 2207/30024; G06T 2207/30061; G06T 2207/30096
See application file for complete search history.

(56) References Cited

U.S. PATENT DOCUMENTS

| | | | | |
|---|---|---|---|---|
| 6,783,961 B1 * | 8/2004 | Edwards | ................ | C12N 15/81<br>536/23.1 |
| 6,797,471 B2 | 9/2004 | Katz et al. | | |

(Continued)

FOREIGN PATENT DOCUMENTS

| | | |
|---|---|---|
| CN | 104813366 A | 7/2015 |
| CN | 106296635 A | 1/2017 |

(Continued)

OTHER PUBLICATIONS

International Preliminary Report on Patentability for International Application No. PCT/US2020/066959, mailed Jul. 7, 2022, 24 pages.

(Continued)

*Primary Examiner* — Kevin Ky
(74) *Attorney, Agent, or Firm* — Fenwick & West LLP; Matthew Pavao; Andy Henderson

(57) ABSTRACT

In some embodiments, a non-transitory processor-readable medium stores code representing instructions to be executed by a processor. The code includes code to cause the processor to receive a plurality of sets of images associated with a sample treated with fluorescence in situ hybridization
(Continued)

(FISH) probes. Each image from that set of images is associated with a different focal length using a fluorescence microscope. Each FISH probe can selectively bind to a unique location on chromosomal DNA in the sample. The code further causes the processor to identify cell nuclei in the images. The code further causes the processor to apply a convolutional neural network (CNN) to each set of images. The CNN is configured to identify a probe indication from a plurality of probe indications for that set of images. The code further causes the processor to identify the sample as containing circulating tumor cells.

7 Claims, 10 Drawing Sheets

(52) U.S. Cl.
CPC ............... *G06T 2207/30061* (2013.01); *G06T 2207/30096* (2013.01)

(56) References Cited

U.S. PATENT DOCUMENTS

| | | | | |
|---|---|---|---|---|
| 7,741,034 | B2 | 6/2010 | Katz et al. | |
| 8,093,001 | B2 | 1/2012 | Katz et al. | |
| 8,280,140 | B2 | 10/2012 | Levenson et al. | |
| 9,291,625 | B2 | 3/2016 | Semizarov et al. | |
| 9,739,783 | B1 | 8/2017 | Kumar et al. | |
| 10,047,403 | B2 | 8/2018 | Semizarov et al. | |
| 10,580,130 | B2 | 3/2020 | Frangioni | |
| 10,769,501 | B1 | 9/2020 | Ando et al. | |
| 2013/0208950 | A1* | 8/2013 | Athelogou | G06V 20/693 382/129 |
| 2014/0235472 | A1* | 8/2014 | Shetty | C12Q 1/6837 506/9 |
| 2023/0041229 | A1* | 2/2023 | Tahvilian | G01N 21/6458 |
| 2024/0209417 | A1* | 6/2024 | Blidner | C12Q 1/6874 |
| 2025/0061732 | A1* | 2/2025 | Li | G06V 10/26 |
| 2025/0109443 | A1 | 4/2025 | Katz | |
| 2025/0111910 | A1* | 4/2025 | Vidmar | G06F 40/40 |

FOREIGN PATENT DOCUMENTS

| | | | |
|---|---|---|---|
| EP | 2494360 | B1 | 8/2017 |
| WO | WO 2011/056489 | A2 | 5/2011 |
| WO | WO 2016/094698 | A1 | 6/2016 |

OTHER PUBLICATIONS

International Search Report and Written Opinion for International Application No. PCT/US2020/066959, mailed Mar. 23, 2021, 27 pages.

Katz et al: "Genetically Abnormal Circulating Cells in Lung Cancer Patients: An Antigen-Independent Fluorescence In situ Hybridization-Based Case-Control Study", Clinical Cancer Research, val. 16, No. 15, Aug. 2010, pp. 3976-3987.

Ntouroupi et al: "Detection of circulating tumour cells in peripheral blood with an automated scanning fluorescence microscope", British Journal of Cancer, val. 99, No. 5, Aug. 5, 2008, pp. 789-795.

Prabhakar et. al., "SpotLearn: Convolutional Neural Network for Detection of Fluorescence In Situ Hybridization (FISH) Signals in High-Throughput Imaging Approaches" Cold Spring Harbor Symposia On Quantitative Biology, vol. 82, 2017, pp. 57-70.

Utkrisht et al., "EcSeg: Semantic Segmentation of Metaphase Images Containing Extrachromosomal DNA", iScience, Nov. 22, 2019, pp. 428-435.

Vasudeva et. al., "Towards Designing Accurate FISH Probe Detection using 3D U-Nets on Microscopic Blood Cell Images" Proceedings of the 7th ACM IKDD CoDS and 25th COMAD, Jan. 5, 2020, ACM, New York, NY, USA, pp. 282-288.

Xu et al. "An efficient fluorescence in situ hybridization (FISH)-based circulating genetically abnormal cells (CACs) identification method based on Multi-scale MobileNet-YOLO-V4", Quantitative Imaging in Medicine and Surgery, 2022;12(5):2961-2976.

Savadikar et al. "Towards designing accurate FISH probe detection using 3D U-nets on microscopic blood cell images." In Proceedings of the 7th ACM IKDD CoDS and 25th COMAD Jan. 5, 2020 (pp. 282-288).

* cited by examiner

B A

SYSTEMS AND METHODS FOR DESIGNING ACCURATE FLUORESCENCE IN-SITU HYBRIDIZATION PROBE DETECTION ON MICROSCOPIC BLOOD CELL IMAGES USING MACHINE LEARNING

CROSS-REFERENCE TO RELATED APPLICATIONS

This application is a U.S. National Phase Application, filed under U.S.C. § 371(c), of International Application No. PCT/US2020/066959, filed Dec. 23, 2020, which claims priority to and benefit of U.S. Provisional Application No. 62/952,914, titled "Towards Designing Accurate Fluorescence In-Situ Hybridization Probe Detection using 3D U-Nets on Microscopic Blood Cell Images," filed Dec. 23, 2019, the entire disclosure of each of which are incorporated herein by reference in their entirety.

BACKGROUND

Some embodiments described herein relate generally to systems and methods for fluorescence in-situ hybridization probe detection. In particular, but not by way of limitation, some embodiments described herein relate to systems and methods to design accurate fluorescence in-situ hybridization probe detection on microscopic blood cell images using machine learning models.

The estimated new cases of lung cancer exceeded 230,000 in 2018, and the five-year survival rate has marginally increased from 11.4% in 1975 to 17.5% in 2013. This is in part due to the lack of an early detection solution. The ability to identify lung cancer at earlier stage would have significant impact on overall outcome. Low-dose computed tomography (LDCT) is the standard for lung cancer screening and the National Lung Screening Trial showed a 20% reduction in lung cancer-specific mortality. While highly sensitive, LDCT suffers from low specificity and a high false positive rate.

Using blood for cancer diagnostics is advantageous given the specimen can be obtained inexpensively and less invasively than tissue biopsy. While often associated with later-stage disease, direct measurement of circulating tumor cells (CTC) is a promising emergent technology that provides an astute means for the detection of early lung cancer. Circulating tumor DNA (ctDNA) is limiting in early-stage disease as is reflected in low sensitivity and poor overall performance of this analyte for early detection. Known methods use fluorescence in situ hybridization (FISH) on tumor cells enriched from the whole blood of patients with indeterminate pulmonary nodules for detection of aneuploidy. A need exists for a time-efficient, highly sensitive, and accurate design of FISH detection on CTC to aid in the diagnosis of patients with indeterminate pulmonary nodules and the clinical monitoring for lung cancer recurrence.

SUMMARY

In some embodiments, a non-transitory processor-readable medium storing code representing instructions to be executed by a processor, the code comprising code to cause the processor to receive a plurality of sets of images associated with a sample treated with a plurality of fluorescence in situ hybridization (FISH) probes. Each set of images from the plurality of sets of images is associated with a FISH probe from the plurality of FISH probes. Each image from that set of images is associated with a different focal length using a fluorescence microscope. Each FISH probe from the plurality of FISH probes is configured to selectively bind to a unique location on chromosomal DNA in the sample. The code further includes code to cause the processor to identify a plurality of cell nuclei in the plurality of sets of images based on an intensity threshold associated with pixels in the plurality of sets of images. The code further includes code to cause the processor to apply, for each cell nuclei from the plurality of cell nuclei, a convolutional neural network (CNN) to each set of images from the plurality of sets of images associated with that cell nuclei. The CNN is configured to identify a probe indication from a plurality of probe indications for that set of images. Each probe indication is associated with a FISH probe from the plurality of FISH probes. The code further includes code to cause the processor to identify the sample as containing circulating tumor cells based on the CNN identifying a number of the plurality of probe indications and comparing the number of the plurality of probe indications identified with an expression pattern of chromosomal DNA of a healthy person. The code further includes code to cause the processor to generate a report indicating the sample as containing the circulating tumor cells.

DETAILED DESCRIPTION

Figure 1:
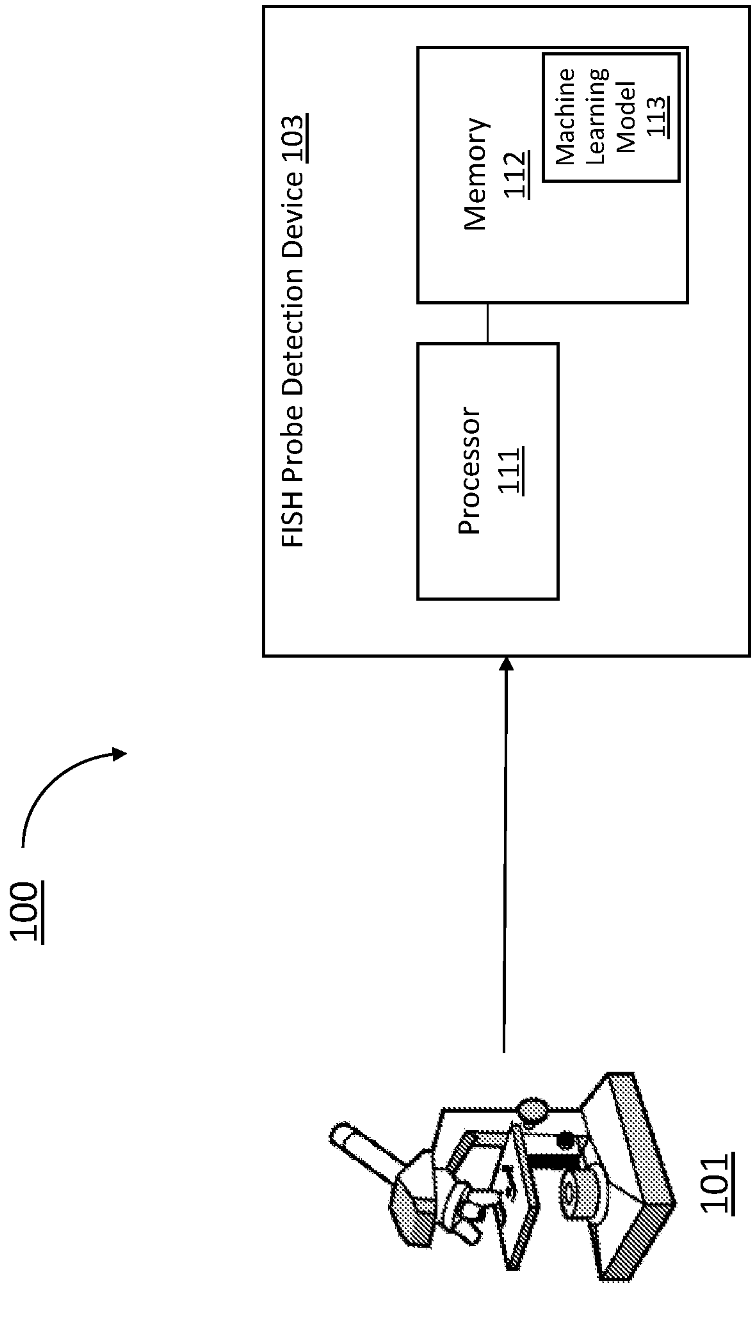
FIG. 1 is a block diagram illustrating a fluorescence in situ hybridization (FISH) probe detection system, according to some embodiments.
Figure 2:
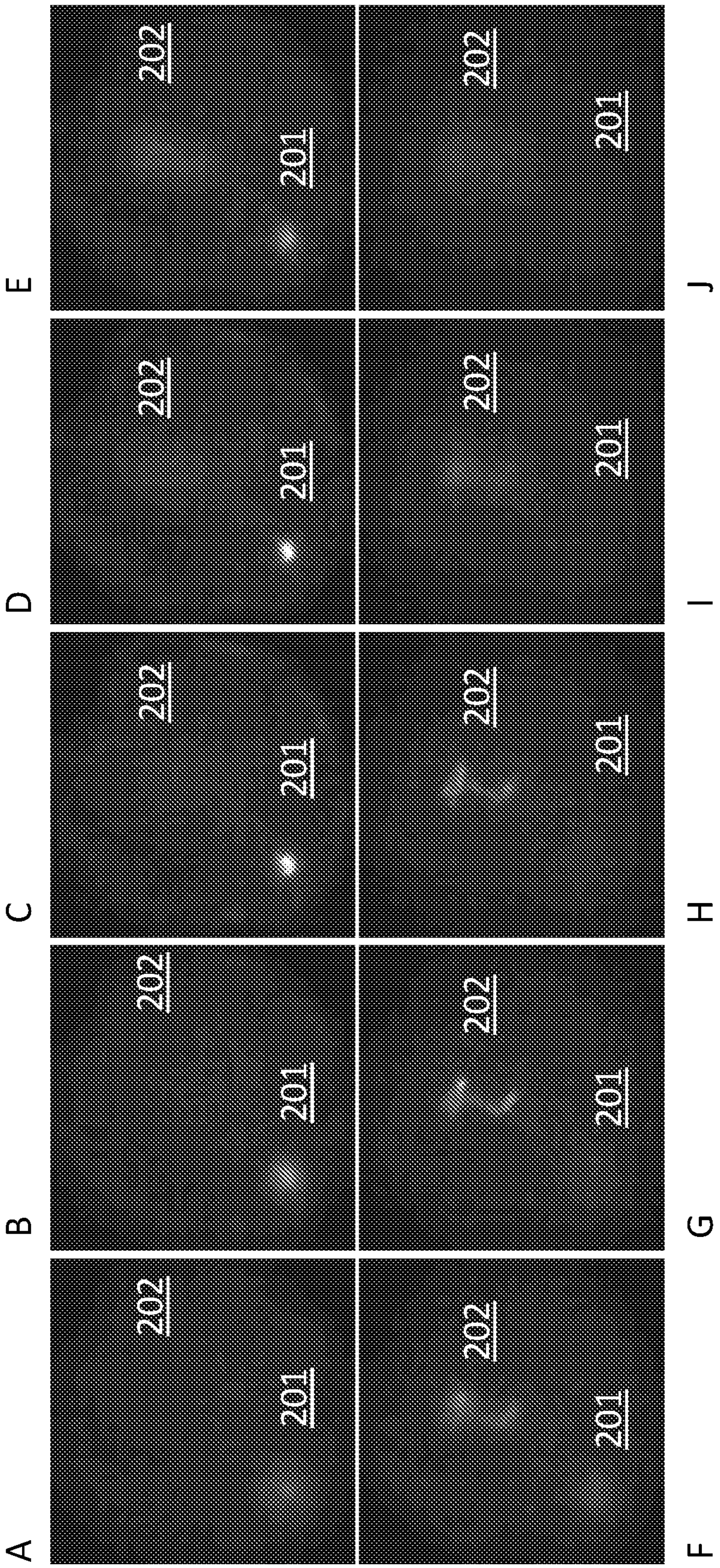
FIGS. 2A-2J show 10 of the 21 Z-Stacks microscopic images of the Aqua probe of a single cell, taken by the FISH probe detection system, according to some embodiments.
Figure 3:
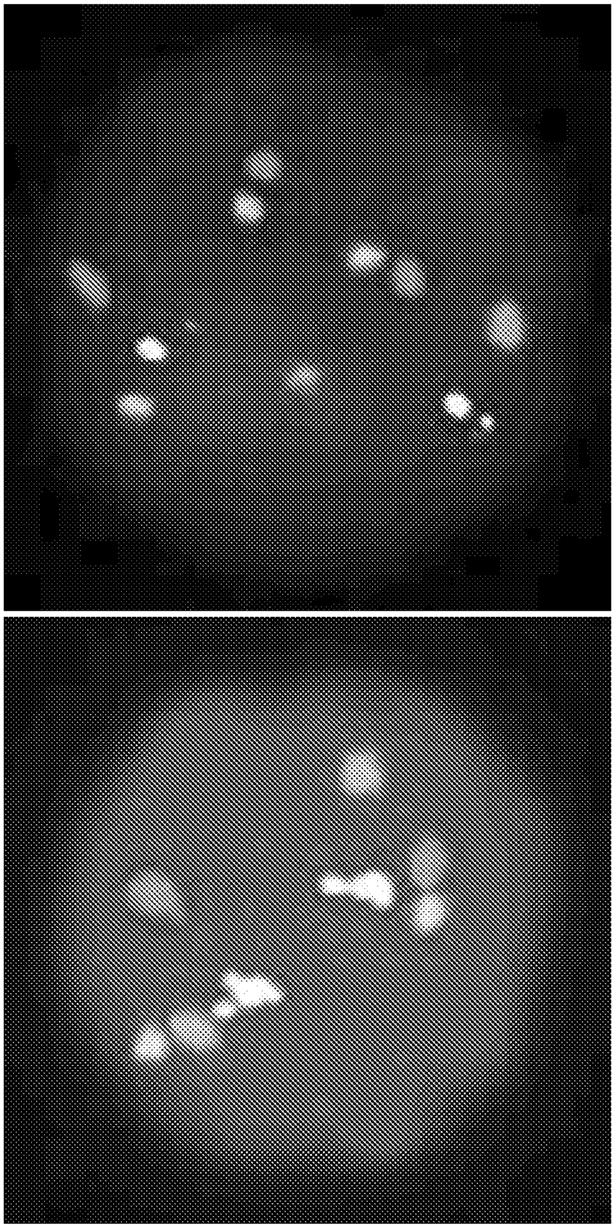
FIGS. 3A-3B show images of a sample single cell, taken by the FISH probe detection system, with all four color FISH probes visible, according to some embodiments.
Figure 4:
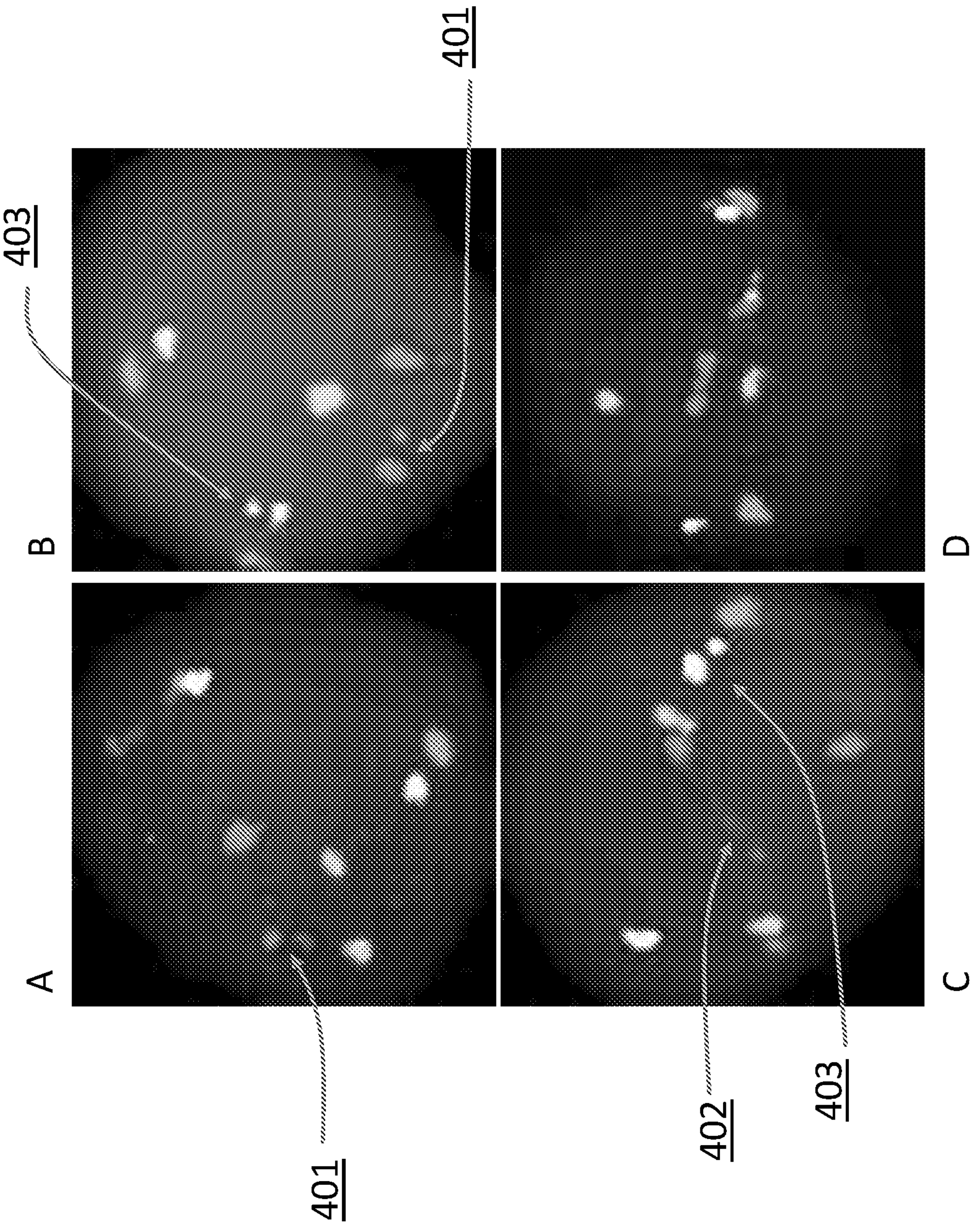
FIGS. 4A-4D show signal characteristics, received by the FISH probe detection system, which vary for different color FISH probes, according to some embodiments.

Fluorescence in situ hybridization (FISH) is a molecular cytogenetic technique for detecting and locating a specific nucleic acid sequence. The technique relies on exposing, for example, chromosomes to a small DNA sequence called a probe that has a fluorescent molecule attached to it. The probe sequence binds to its corresponding sequence (or a unique location) on the chromosome. Fluorescence microscopy can be used to find out where the fluorescent probe is bound to the chromosomes. FISH can also be used to detect and localize specific RNA targets in cells. FISH can be used to identify chromosomal abnormalities indicative of circulating tumor cells, and/or other cancerous cells in tissue samples.

Some embodiments described herein relate to four-color FISH tests. Such tests employ four probes, each of which is configured to selectively bind to a different location on chromosomal DNA such that genetic abnormalities associated with those four locations can be monitored and/or detected. In some embodiments described herein the FISH probes are applied to mononuclear cells isolated from peripheral blood. For ease of discussion, green (Gr), red (R), aqua (A), and gold (G) FISH probes are discussed herein. It should be understood, however, that although fluorescence in situ hybridization (FISH) technique is described, embodiments discussed herein do not limit to only the FISH technique. Additionally, while embodiments described herein discuss Gr, R, A, G probes, which can be readily be detected by their different emission spectra, it should be understood that any suitable probe or combination of probes having any suitable emission spectra can be used. The design of the machine learning models discussed herein can similarly be applied to other molecular probing techniques, fluorescence techniques, and/or other fluorescence emission probes. Once the blood sample is treated with the four FISH probes, the images of the blood sample can be captured by fluorescence microcopy. The images can be processed and machine learning models can segment the pixels of the images and predict whether or not a specific area in an image indicates a probe (i.e., probe indications). The FISH probe detection system can count the number of probe indications and compare the number of probe indications with an expression pattern of a healthy cell and/or person. The FISH probe detection system then makes a determination on whether the blood sample contains genetic abnormalities.

Because Circulating Tumor Cells (CTCs) are the primary indicator for positive lung cancer, the FISH probe detection system uses machine learning models to classify and predict the target cells as CTC or Non-CTC. In some implementations, the CTC cells are defined as any combination of probes that differ from the normal expression pattern of 2Gr/2R/2A/2G diploid expression of a healthy cell. In other implementations, the FISH probe detection system can classify a cell as a Circulating Tumor Cell (CTC) when an increase of the probe indications in any two or more channels (of FISH probes) are determined.

Instead of capturing a single image of a cell and/or sample captured at a fixed focal length, embodiments described herein generally capture multiple images around the focal plane with different focal lengths (i.e., a Z-Stack) of various cells to correctly identify and predict probe indications in the images. In addition, because different color FISH probes exhibit different characteristics, the FISH probe detection system applies different machine learning models to different color FISH probes. The FISH probe detection system provides a system that detects genetic abnormalities (e.g., circulating tumor cells) with high accuracy, low false positives, and time efficiency to aid in the diagnosis of patients with indeterminate pulmonary nodules and the clinical monitoring for lung cancer recurrence.

FIG. 1 is a block diagram illustrating a fluorescence in situ hybridization (FISH) probe detection system, according to some embodiments. The FISH probe detection system 100 includes a fluorescence microscope 101 and a FISH probe detection device 103. The FISH probe detection device 103 includes a processor 111 and a memory 112 operatively coupled to the processor 111. The fluorescence microscope 101 and the FISH probe detection device 103 can be communicatively coupled with each other via a communication network (not shown). The network can be a digital telecommunication network of servers and/or compute devices. The servers and/or compute devices on the network can be connected via one or more wired or wireless communication networks (not shown) to share resources such as, for example, data storage and/or computing power. The wired or wireless communication networks between servers and/or compute devices of the network can include one or more communication channels, for example, a WiFi® communication channel, a Bluetooth® communication channel, a cellular communication channel, a radio frequency (RF) communication channel(s), an extremely low frequency (ELF) communication channel(s), an ultra-low frequency (ULF) communication channel(s), a low frequency (LF) communication channel(s), a medium frequency (MF) communication channel(s), an ultra-high frequency (UHF) communication channel(s), an extremely high frequency (EHF) communication channel(s), a fiber optic commination channel(s), an electronic communication channel(s), a satellite communication channel(s), and/or the like. The network can be, for example, the Internet, an intranet, a local area network (LAN), a wide area network (WAN), a metropolitan area network (MAN), a worldwide interoperability for microwave access network (WiMAX®), a virtual network, any other suitable communication system and/or a combination of such networks.

In some implementations, the fluorescence microscope 101 can be configured to capture images of samples treated with FISH color probes. The fluorescence microscope 101 can be configured to adjust the focal length when taking each image and capture a set of images of the same sample with different focal lengths (i.e., Z-Stack images). The Z-stack images provide spatial and depth variances of the cells to improve the accuracy of identifying probe indications using machine learning models. In some implementations, the processor 111 can be, for example, a hardware based integrated circuit (IC) or any other suitable processing device configured to run and/or execute a set of instructions or code. The processor 111 can be configured to execute the process described with regards to FIG. 10 (and FIGS. 2-9.) For example, the processor 111 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 111 is operatively coupled to the memory 112 through a system bus (for example, address bus, data bus and/or control bus).

The memory 112 can be, for example, a random-access memory (RAM), a memory buffer, a hard drive, a read-only memory (ROM), an erasable programmable read-only memory (EPROM), and/or the like. The memory 111 can be a non-transitory processor-readable medium storing, for example, one or more software modules and/or code that can include instructions to cause the processor 111 to perform one or more processes, functions, and/or the like (e.g., the machine learning model 113). In some implementations, the memory 112 can be a portable memory (for example, a flash drive, a portable hard disk, and/or the like) that can be operatively coupled to the processor 112.

Data Description

Embodiments described here include a four-color FISH test that probes four unique locations on chromosomal DNA for genetic abnormalities in mononuclear cells isolated from peripheral blood. In some implementations, there are about 10,000-80,000 cells deposited onto a microscope slide and processed using the four-color FISH Assay (having four probes with different spectral characteristics: Aqua probe, Gold probe, Green probe, and Red probe). Once the cells have been probed, images of the slide are taken using the fluorescence microscope (e.g., 101 in FIG. 1) and processed using the FISH probe detection device (e.g., 103 in FIG. 1).

The FISH probe detection system (e.g., 100 in FIG. 1) is configured to take an image (or a z-stack of images) configured to detect cells and/or cell nuclei. For example, the sample can be stained with 4',6-diamidino-2phenylindole (DAPI) and the detection system 100 can capture an image (or a z-stack of images) configured to detect DAPI. For example the fluorescence microscope 101 can be configured to selectively excite the DAPI and capture an image (or a z-stack of images) that do not include significant (<5%) luminescence from FISH probes. As another example, a physical filter can be applied to the fluorescence microscope 101 or a software filter can be applied to an image to produce an image in which DAPI fluorescence has high contrast with background. The location, size, and/or shape of cells and/or nuclei in the sample can be determined based on an image(s) of the sample capturing DAPI fluorescence. The DAPI images provides information on at least the boundary of the cell nuclei in which the probe indications are determined and counted using machine learning models.

The FISH probe detection system 100 can further be configured to produce separate images for each individual color FISH probe. For example, the FISH probe detection system (e.g., 100 in FIG. 1) is configured to take a 4 sets of 21 images of the sample (1 set of images per probe) to provide depth information (i.e., the Z-Stack) and, in some instances, 1 combined maximum-intensity (or full spectrum) image of the sample. Each set of images can be captured by selectively exciting one probe and/or by applying a bandpass filter (in hardware and/or software) to selectively capture the emissions of one probe. In some embodiments, each set of images can be captured separately. In other embodiments, multiple sets of images can be produced and/or analyzed by filtering a "master" set of images.

Unlike known methods for processing images of FISH-labeled samples that typically rely on a single in-focus image, the FISH probe detection system (e.g., 100 in FIG. 1) described herein is configured to take multiple stacks of images around the focal plane with different focal lengths (i.e., a Z-Stack) of the sample. In some implementations, the FISH probe detection device (e.g., 103 in FIG. 1) receives five channels of images of the sample from the microscope. The five channels includes a first channel having images (DAPI) without probe information, a second channel of images for cells processed with Aqua probe, a third channel of images for cells processed with Gold probe, a fourth channel of images for cells processed with Green probe, and a fifth channel of images for cells processed with Red probe. In some implementations, the order in which these channels of images are captured can be adjusted in different situations. In other implementations, these channels of images are captured in an order of the DAPI channel, the channel with the red probe, the channel with the gold probe, the channel with the green probe, and the channel of the aqua probe such that the fluorescence intensity of the probes are preserved and photobleaching is minimized. In some implementations, the FISH probe detection device (e.g., 103 in FIG. 1) can generate a sixth channel of images for that cell by digitally combining the images from the first channel through the fifth channel (e.g., FIGS. 3A-3B, FIGS. 4A-4D) into images in standard RGB format. In other implementations, the fluorescence microscope can be configured to capture multi-color images on cells treated with multiple probes. The FISH probe detection device can be configured to identify the number of bright spots (i.e., probes, or probe indications) for each of these channels.

FIGS. 2A-2J show 10 of the 21 Z-Stacks microscopic images of the Aqua probe of a single cell, taken by the FISH probe detection system, according to some embodiments. In some implementations, the FISH probe detection system is configured to take approximately 550 frames to scan an entire patient sample generating approximately 72,600 (550×6×22) images to process 10,000-30,000 analyzable cells (approximately 65-180 GB per patient). In some implementations, the spatial dimensions of a cell are close to 128×128 pixels. As shown in FIGS. 2A-2J, the 10 Z-Stack images taken by the FISH probe detection system show a progression from the two probes (201 and 202) appear and disappear at different depths in the Z-Stacks.

The FISH probe detection system can be configured to classify the cells based on their probe expression pattern and nuclei morphology. FIGS. 3A-3B show images of a sample single cell, taken by the FISH probe detection system, with all four color FISH probes (or probe indications) visible, according to some embodiments. The 4 color FISH Probes include green (Gr), red (R), aqua (A), and gold (G). The FISH probe detection system can be configured to isolate and probe nucleated cells from peripheral blood in search of genetic abnormalities, defined as any combination of probes that differ from the normal expression pattern of 2Gr/2R/2A/2G diploid expression. There can be various expression patterns, including gains or deletions of probe indications, that can then be classified, by the FISH probe detection system, into defined categories used to analyze a cell. A normal cell, in some instances, can be characterized as expressing a pattern of 2Gr/2R/2A/2G. In some implementations, the majority of cells are classified as normal cells. FIG. 3A shows an example of the normal cell. A single gain is defined as a gain in any single probe channel. For example, an expression pattern of 2Gr/2R/2A/3G can be considered a single Gold gain. An expression pattern of 2Gr/3R/2A/2G can be a single red gain. A single deletion is defined as a probe loss in any single channel. For example, an expression pattern of 2Gr/2R/1A/2G can be considered a single aqua deletion. In some implementations, the FISH probe detection system can classify a cell as a Circulating Tumor Cell (CTC) when an increase of the probe indications in any two or more channels (of FISH probes) are determined. For example, the FISH probe detection system can determine detection of a CTC based on an expression pattern of 2Gr/2R/4A/4G (as shown in FIG. 3B). The number of Aqua probe indications is four, increased by a number of two compared to the expression pattern of a healthy cell. Thus, the CNN identifies this cell as a CTC. The number of Green probe indications is also four, increased by a number of 2 compared to the expression pattern of a healthy person. But because one color probe has already increased by a number of 2, the second machine learning model can determine the cell as CTC. CTCs are the target cells and the cells considered most important to diagnosing positive lung cancer. If the CTC count, as identified by the FISH probe detection system or the human expert, exceeds a pre-determined threshold, that patient can be diagnosed positively with lung cancer.

FIGS. 4A-4D show signal characteristics, received by the FISH probe detection system, which vary for different color FISH probes, according to some embodiments. For example, the Green probe can produce tight circular probes that are easy to distinguish. The Green probe, however, can also produce high amounts of background noise which need to be differentiated from true probes. There are a small number of cells that have very high background noise and non-specific probes called spurious cell. For another example, the Red probe can produce tight circular probes that are typically easy to distinguish. However, the Red probe can split on a small number of probes (401 in FIGS. 4A and 4B). In some examples, the Aqua probe signal tends to break and stretch, making it difficult to perform classification and get accurate probe counts (402 in FIGS. 4A and 4C). This can cause a high number of false gains. These stretched Aqua probes should still be counted as one signal. The Gold Probe can produce tight circular probes that are typically easy to distinguish, however Gold probes can split more often or have a smaller signal orbiting the true signal like a 'satellite' (403 in FIGS. 4B and 4C). In some implementations, the FISH probe detection system does not count the satellite probes as true probes.

Methodology

Because Circulating Tumor Cells (CTCs) are a primary indicator for positive lung cancer, in some implementations, the FISH probe detection system (e.g., the processor 111 in the Fish Probe Detection Device 103 in FIG. 1) uses a machine learning model to classify the target cells as CTC or non-CTC. The non-CTC class includes detections identified as Single Gain, Deletion, and Normal. This classification reduces the effort on expert's verification since, out of 10,000 to 30,000 analyzed cells, typically only about 4-20 CTCs are observed in a cancerous patient. The data is, however, imbalanced and annotating every cell with a corresponding class label is not feasible.

Figure 5:
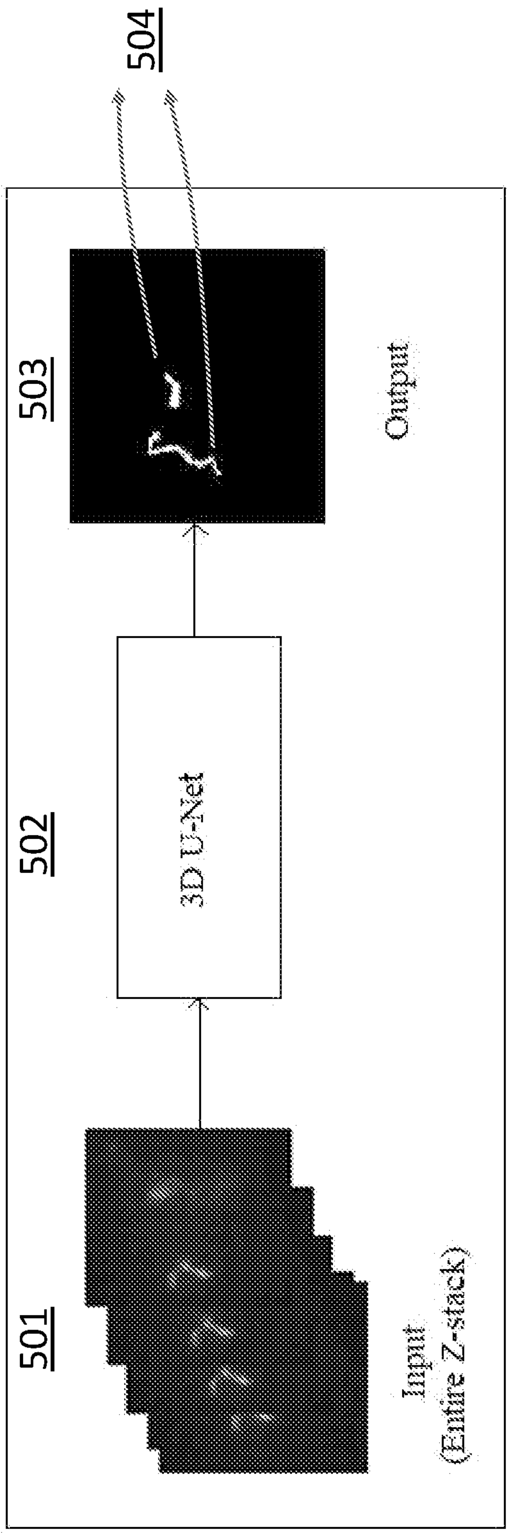
FIG. 5 shows a diagram of the image processing performed by the FISH probe detection device, according to some embodiments.
Figure 6:
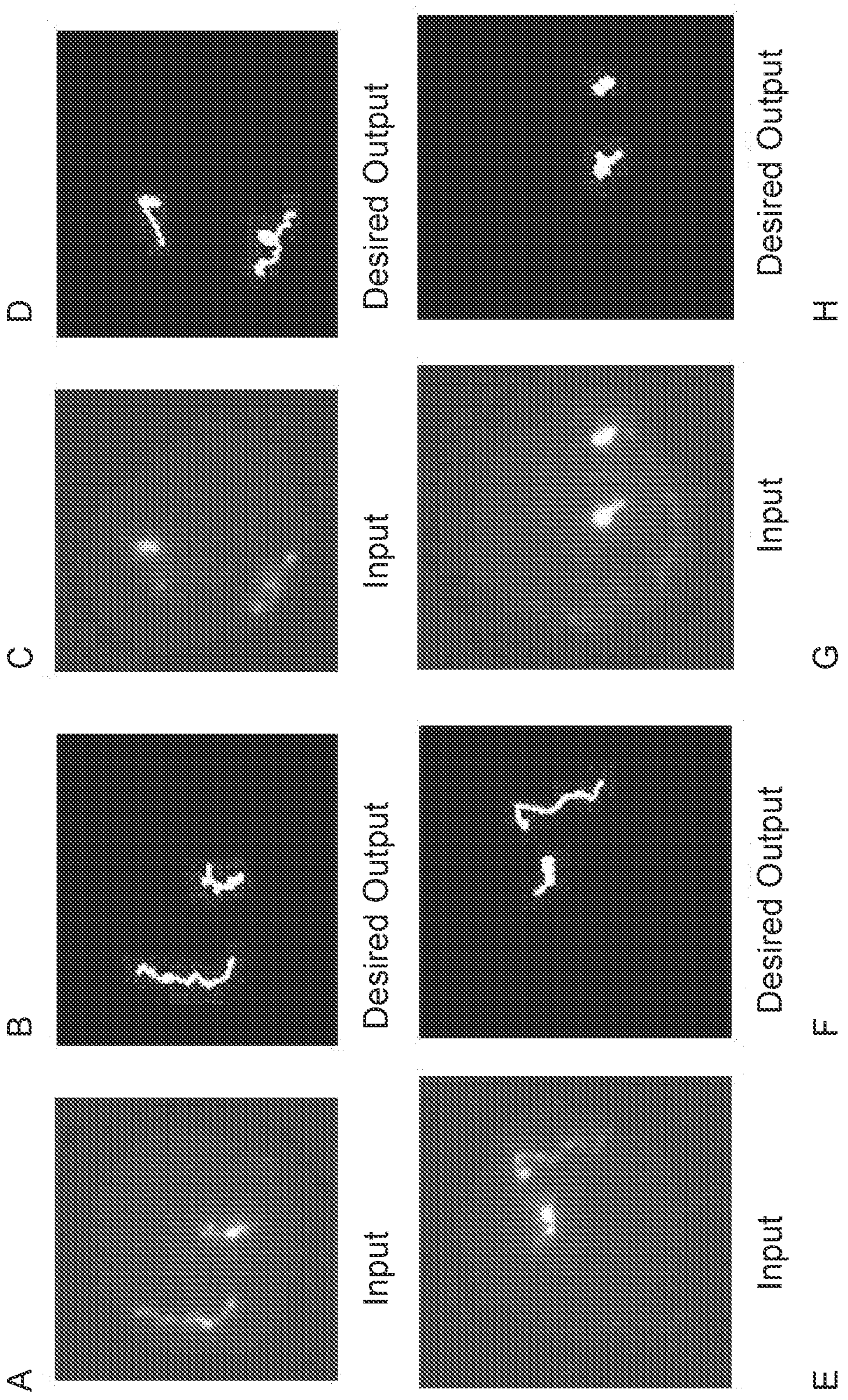
FIGS. 6A-6H show input microscopic images and desired output of microscopic images using segmentation masks, according to some embodiments.

In other implementations, the FISH probe detection system (e.g., the processor 111 in the Fish Probe Detection Device 103 in FIG. 1) analyzes each cell at the probe level upon capturing the Z-stack images of a sample treated (e.g., sequentially) with the four color probes and extracting the images of each cell for each probe. Specifically, once the FISH probe detection system (e.g., the processor 111 in the Fish Probe Detection Device 103 in FIG. 1) detects and counts the probes (or probe indications), the FISH probe detection system (e.g., the processor 111 in the Fish Probe Detection Device 103 in FIG. 1) can determine the class based on the counts of the probes (or probe indications). In these implementations, each plane of the Z-Stack is a gray-scale image, where the probes are brighter compared to the background. The colors denoting the probes represent different parts of a chromosome visible, and the actual images are gray-scale. FIG. 5 shows a diagram of the image processing performed by the FISH probe detection device, according to some embodiments. Upon receiving the Z-Stack images 501 from the fluorescence microscope (e.g., 101 in FIG. 1), the FISH probe detection device (e.g., processor 111 in FIG. 1) can, based on a machine learning model 502 (e.g., a convolutional neural network, or a 3D U-Net), extract the pixels of the probes from the background using semantic segmentation, where the probes can be marked as binary 1 and the background can be marked as a binary 0. The FISH probe detection device can then generate an output image 503 and identify (and predict) probe indications 504. In some implementations, the ground-truth output masks can be automatically (using the machine learning model stored in the FISH probe detection device) or manually drawn around the probes using the maximum intensity projection.

FIGS. 6A-6H show input microscopic images and desired output of microscopic images using segmentation masks, according to some embodiments. In some implementations, a human expert can manually annotate the images and label the probe indications in the Z-Stack images. The annotated images can then be used to train the machine learning model. In some implementations, the manual data annotations are not used in the actual testing the new patient samples. In some implementations, the machine learning model incorporates a variety of variables including, but not limited to, probe size, intensity, spacing, roundness, texture, and/or the like. These variables can be trained, adjusted, and updated using the methods discussed below.

Machine Learning Model Design

In some embodiments, the FISH probe detection device (e.g., the processor 111 of the FISH probe detection device 103) can be configured to process the FISH probe images in two phases. In the first phase, upon capturing the FISH probe images (i.e., Z-stack images) of the sample treated with each color probe of the four color probes, the FISH probe detection device can extract (or identify) cell nuclei from the FISH probe images using a first machine learning model (e.g., an automatic image thresholding model, a K-Means clustering model, Pyramid Mean Shift filtering, etc.). In some implementations, the first machine learning model can generate an intensity threshold (or a set of intensity thresholds) that separate pixels in images into two classes, foreground and background. The FISH probe detection device can extract the pixels that are classified as foreground and define these pixels as nuclei. In some implementations, the first machine learning model can generate the threshold(s) using the global histogram of the FISH probe image.

In the second phase, the FISH probe detection device can use, at least one second machine learning model (e.g., convolutional neural network (CNN), or any other suitable technique), to segment probe signals (or pixels) using the Z-stacks of the nuclei generated during the first phase. The second machine learning model can predict and determine a binary number for each pixel on the image. For example, pixels associated with a probe associated with a particular CNN can be marked as binary 1 and the background (e.g., pixels not associated with a probe associated with a particular CNN) can be marked as a binary 0). The FISH probe detection device can determine a number of the probes using, for example, connected-components to separate multiple areas with pixels having a binary number of 1. The FISH probe detection device can identify each area as a probe indication. In some embodiments, the FISH probe detection device can perform post-processing the data generated during the second phase (e.g., rejecting small probe signals) to improve the accuracy of the detection and classification. As shown in FIGS. 2A-2J, an intensity of pixels associated with a probe can vary in intensity as a factor of focal length. Similarly stated, a probe located in a particular position in the x-y plane may not appear/be detectable with all focal lengths (e.g., in the z-dimension). Thus, a probe may be present in any of the 21 images of the Z-Stacks. Therefore, the second machine learning model can be configured to process Z-Stack images with spatial and depth invariance. In some implementations, the second machine learning model can be Convolutional Neural Network configured to evaluate three-dimensional images (3D U-Net). In some implementations, the FISH probe detection device can perform the image processing (and predicting) with the first machine learning model (first phase) in a process flow of the image processing (and predicting) with the second machine learning model (second phase). Therefore, the machine learning models discussed herein can refer to the first machine learning model (first phase) and/or the second machine learning model (second phase). In some implementations, as discussed in more detail below, a different machine learning model can be applied to a different color probe. Thus, the second machine learning model can include more than one machine learning model.

In some embodiments, each color FISH probe of the four color FISH probes can exhibit different properties (or different characteristic patterns) and have different levels of complexity. Thus, the FISH probe detection device can include separate trained machine learning model for each color probe, with a different architecture for each color probe. In some implementations, the FISH probe detection device can use, for example, Batch Normalization for stabilizing the training and faster convergence, and ReLU non-linearity. In some implementations, the last convolutional layer of the machine learning model can use sigmoid activation function to produce pixel wise probabilities. For example, the machine learning model can be configured to generate a probability value for each pixel in an image indicating the likelihood of being a part of a probe (i.e., pixel-wise probability). In some instances, when the probability value of a pixel is greater than 50%, the machine learning model can determine that pixel as a part of the probe.

For example, some known aqua probes can characteristically "spread out" (e.g., a spreading probe indication). In some examples, a trained machine learning model can be configured to identify pixels as being portions of a contiguous indication of an aqua probe when a small connection is observed between multiple bright regions. When no connection is present, the machine learning model can segment the discrete components separately. Such a machine learning model can be trained, for example, with example contiguous indications of aqua probes identified by a human expert (e.g., the CNN can be a supervised machine learning model). In some implementations, the machine learning model can be based on a 3D U-Net trained on images depicting aqua probes. In such implementations, the FISH probe detection device can perform projection from 3D to 2D at the end of the U-Net with a 2D convolutional layer.

Figure 7:
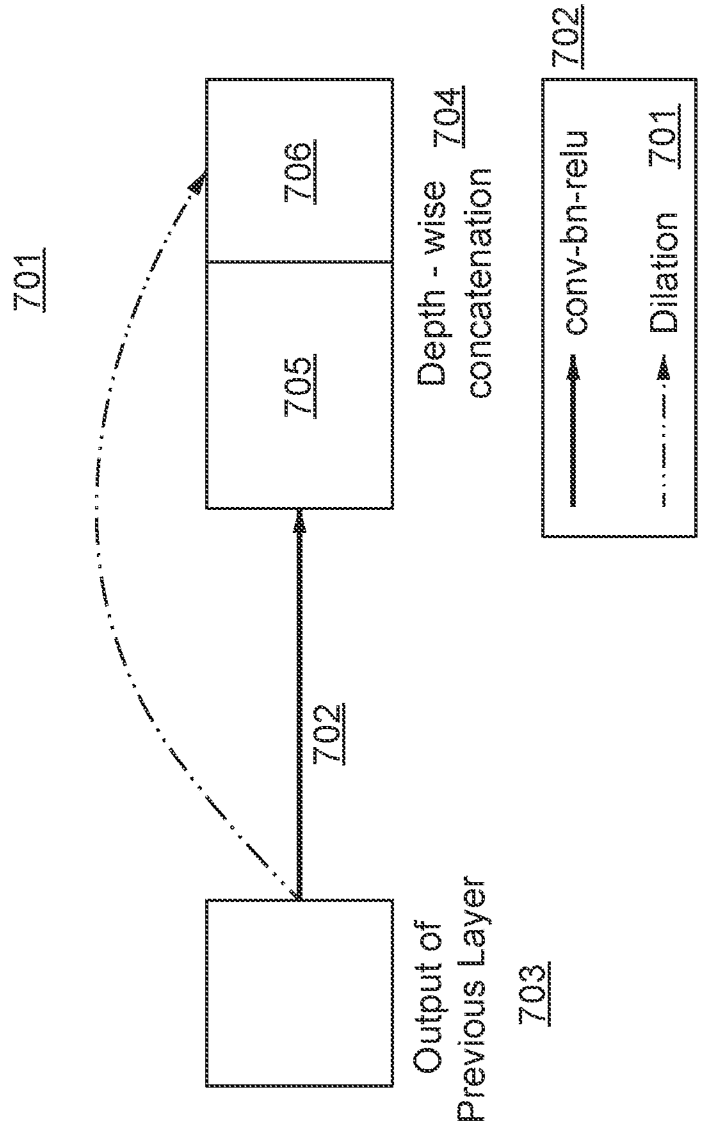
FIG. 7 shows a block diagram illustrating the process flow of the machine learning model for the Gold probes, according to some embodiments.

As another example, some known gold probes can characteristically include satellite probes connected to the parent probe during segmentation (i.e., a satellite probe indication). Some known image processing algorithms can apply "a dilation" operation which can incorrectly connect close but different probes. This can tend to cause false positive for gold probes. The FISH probe detection device can incorporate, into the machine learning model, these characteristics of Gold probes by employing auxiliary branches which perform dilation parallel to the convolution layer. The machine learning model can perform this operation (i.e., dilation parallel to the convolution layer) more than one sequential layer and a dilation with kernels of multiple sizes can be performed. The convolution layers can then learn to selectively apply dilation of different scales. FIG. 7 shows a block diagram illustrating the process flow of the machine learning model for the Gold probes, according to some embodiments. The machine learning model of Gold probes can perform convolution, batch normalization and ReLu non-linearity operations 702 ("conv-bn-relu") on the output of the previous layer 703 to generate a first output 705. The machine learning model of Gold probes can also perform the dilation operation 701 on the output of previous layer 703 to generate the second output 706. The machine learning model of Gold probes can then perform the depth-wise concatenation 704 of the first input 705 and the second output 706. In these implementations, the FISH probe detection device can perform projection from 3D to 2D at the end of the U-Net with a 2D convolutional layer. In some implementations, for max-pooling and convolution operations, the machine learning model can use a filter size of 3×3 (3×3×3 in case of 3D convolutions).

Figure 8:
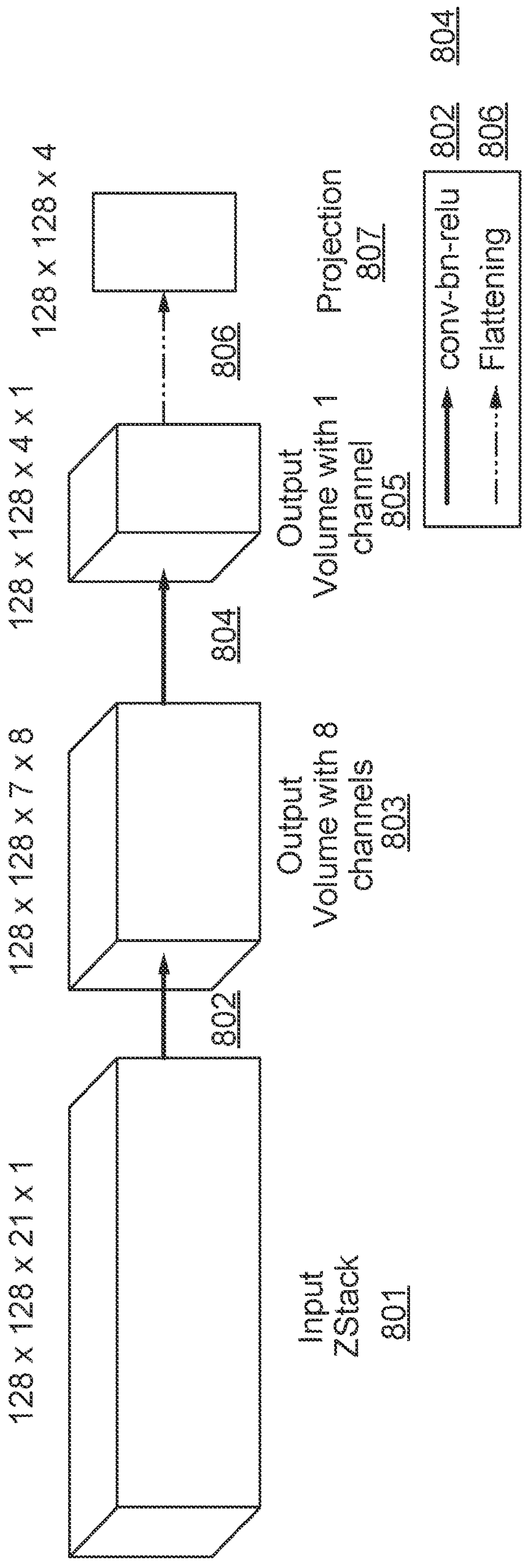
FIG. 8 shows a block diagram illustrating the process flow of the machine learning models for the Red probes and the Green probes, according to some embodiments.
Figure 9:
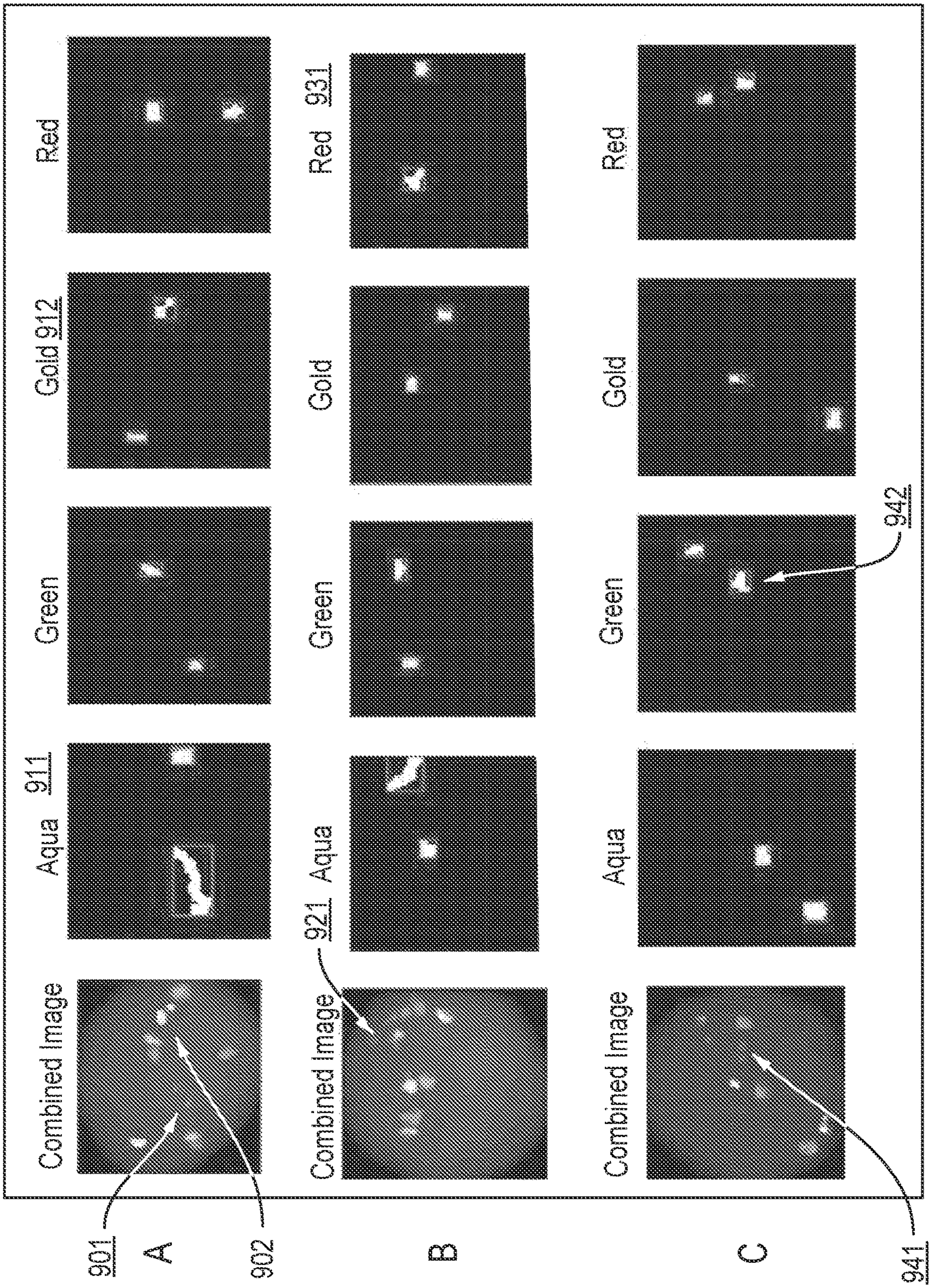
FIGS. 9A-9C show results after applying four machine learning models for the color FISH probes to identify probe indications, according to some embodiments.

As another example, some known red and green probes can be characteristically circular in shape, which can tend to split into two probe indications (i.e., splitting probe indication). Red and Green probes can exhibit similar properties and hence can be modelled with similar models. In these implementations, the machine learning models for the Red probes and the Green probes can be based on a 2-dimensional U-Net. The input to the 2D U-Net can be a projection learned by convolution layers at the start of the machine learning model. The machine learning models can be configured to perform the projection via two 3D convolution layers with strides of three in the depth dimension. FIG. 8 shows a block diagram illustrating the process flow of the machine learning models for the Red probes and the Green probes, according to some embodiments. The processor of the FISH probe detection device can input the Z-stack images 801 into the machine learning model which performs the convolution, batch normalization, and ReLu non-linearity operations 802 ("conv-bn-relu") and produce an output volume with eight channels 803. The processor of the FISH probe detection device can then input the output volume with eight channels 803 into the machine learning model which performs the convolution, batch normalization, and ReLu non-linearity operations 804 ("conv-bn-relu") and produce an output volume with one channel 805. The processor of the FISH probe detection device can then input the output volume with 1 channel 805 into the machine learning model which performs the flattening operation 806 and output the 2D projection 807. The last flattening layer 806 can remove the dummy channel dimension. The projection 807 can be interpreted as a four 2-dimensional feature maps. In some implementations, this 2D U-Net can use dilation branches parallel to convolution layers.

Experimentation and Results

Table 1 shows an example of the number of samples used in the training dataset, validation dataset and testing dataset, according to some embodiments. The image poses a very high class imbalance, since the number of pixels occupied by probes can be only 2 to 3% of the image. The processor of the FISH probe detection device can use a Soft Dice loss function (or a cross-entropy loss) in cases of such high class imbalance to optimize. The Soft Dice loss is $$D = 1 - \frac{2\sum y * \hat{y}}{\sum y + \sum \hat{y}} \tag{1}$$

where y is the ground truth annotation and ŷ is the predicted values of pixel-wise probabilities.

TABLE 1

Numbering of samples used in the training set, the validation set, and the test set for each probe, in some implementations.

| Probe | Train | Validation | Test |
|---|---|---|---|
| Aqua | 970 | 235 | 240 |
| Gold | 552 | 184 | 185 |

TABLE 1-continued

Numbering of samples used in the training set, the validation set, and the test set for each probe, in some implementations.

| Probe | Train | Validation | Test |
|---|---|---|---|
| Green | 508 | 169 | 171 |
| Red | 746 | 287 | 232 |

In some implementations, the processor of the FISH probe detection device can perform three different types of augmentations: Z-Stack order reversal, Random Rotations and Random Intensity Scaling. In some implementations the processor of the FISH probe detection device can perform the Z-Stack order reversal offline. When the processor of the FISH probe detection device performs the Z-Stack reversing, the processor of the FISH probe detection device changes the depth information of the Z-Stack images and maintains the spatial information of the Z-Stack images unchanged. This method encourages all the filters of the machine learning model to learn meaningful representations. The processor of the FISH probe detection device can perform the random intensity scaling to make the machine learning model more robust to a range of intensities which may be seen at test time.

The machine learning model described herein provide an average recall of 94.72% as opposed to 72.9% recall of the known models. Furthermore, the machine learning model described herein results in a percentage reduction of 62.14% in the number of misclassified CTCs over the known models, and additionally shows significant improvement in Normal Cells count and reduction in Single Deletion, Single Gain counts. This shows the effectiveness of the machine learning model described herein over the known models. FIGS. 9A-9C show results after applying a machine learning model for each of the four color FISH probes to identify probe indications, according to some embodiments. The processor of the FISH probe detection device can calculate the number of probe signals based on the number of connected components in the segmented image. The combined image in FIG. 9A shows an example of spread aqua probe 901. Known models incorrectly detect them as three probes. However, the machine learning model described herein correctly detect them as two probes 911, partially due to the inclusion of 21 Z-Stacks in the machine learning model. Similarly, FIG. 9A shows an example of a satellite signal in the Gold probe 902. The machine learning model described herein correctly connects the satellite signal with its parent signal and determine it as one probe signal 912. The combined image in FIG. 9B shows an example of the noise in Red Probe signal 921 and the machine learning model described herein correctly detects it as the background signal and does not include it into the probe signal 931. The combined image in FIG. 9C shows an example of the weak Green probes 941. The output image for Green probe, using the machine learning model described herein, shows a clear detection of Green probe signals 942. In some implementations, the processor of the FISH probe detection device can perform, via the machine learning model, the segmentation in the 3D space (without the projection from 3D to 2D) for each of the 21 Z-Stack images. Therefore, the performance of the machine learning model described herein (e.g., the accuracy in determining the correct probe indications, the reduction in the number of false positives (the cells are incorrectly determined to be CTCs but are actually normal cells), accuracy in determining the single deletion and single gain signals) is greatly improved and optimized.

Figure 10:
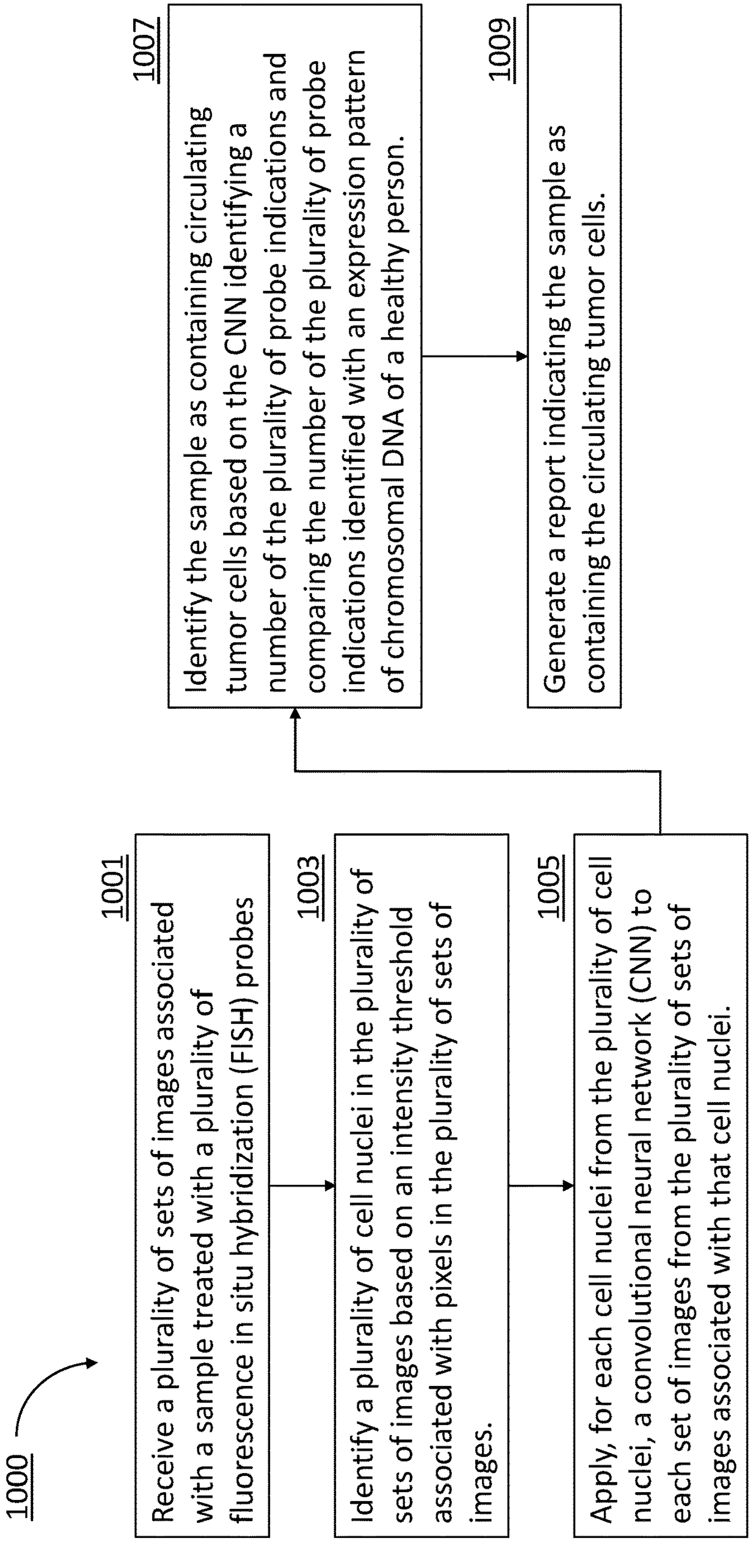
FIG. 10 shows a flow chart illustrating a process of detecting circulating tumor cells using machine learning, according to some embodiments.

FIG. 10 shows a flow chart illustrating a process of detecting circulating tumor cells (CTCs) using machine learning, according to some embodiments. The method 1000 can be executed by a processor (e.g., the processor 111 of a FISH probe detection device 103 in FIG. 1) based on code representing instructions to cause the processor to execute the method 1000. The code can be store in a non-transitory processor-readable medium in a memory (e.g., memory 112 of a FISH probe detection device 103 in FIG. 1).

In some embodiments, a blood sample having a set of cells is treated with a fluorescence in situ hybridization (FISH) assay. The FISH assay can include four Color FISH Probes include a Green probe (Gr), a Red probe (R), an Aqua probe (A), and a Gold probe (G). The method 100 isolates and probes nucleated cells from peripheral blood in search of genetic abnormalities (e.g., circulating tumor cells), defined as any combination of probe indications that differ from the normal expression pattern of the chromosomal DNA of a healthy person. Once the cells have been probed, images of the slide are taken using the fluorescence microscope (e.g., 101 in FIG. 1) and processed using the FISH probe detection device (e.g., 103 in FIG. 1).

At step 1001, the method 1000 includes receiving a plurality of sets of images associated with a sample treated with a plurality of fluorescence in situ hybridization (FISH) probes (e.g., green probe (Gr), a red probe (R), an aqua probe (A), and a gold probe (G)) Each set of images from the plurality of sets of images is associated with a FISH probe from the plurality of FISH probes. Each image from that set of images (i.e. Z-Stack) is associated with a different focal length captured by a fluorescence microscope (e.g., 101 in FIG. 1). Each FISH probe from the plurality of FISH probes is configured to selectively binds to a unique location on chromosomal DNA in the sample. The fluorescence microscope takes separate images for individual color FISH probes and an image without probe information configured to identify cells and/or nuclei using, for example, DAPI. For each cell and each FISH probe, the fluorescence microscope takes, for example, a set of 21 images to provide depth information (i.e., the Z-Stack) and 1 combined maximum-intensity image for all the 4 probes of a cell (e.g., a combined image). For example, the blood sample is treated with four FISH probes such that genetic material in the nucleated cells of the sample are stained are stained with the FISH probes. For a sample treated with the Green FISH probe, the fluorescence microscope takes 21 images with different focal lengths. For the same sample, the fluorescence microscope takes another 21 images with different focal lengths with Aqua FISH probe. Thus, for a single sample, the fluorescence microscope takes at least five sets of images (e.g., DAPI, red, green, gold, and aqua probes) and each set includes at least 21 images with different focal lengths. Instead of solely relying on the in-focus image, the method includes taking multiple stacks of images around the focal plane with different focal lengths (i.e., a Z-Stack) of various cells to correctly identify probe indications in the images to reduce false positives of identifying the probe indication. The false positives can be associated with at least one of a satellite probe indication, a spreading probe indication, or a splitting probe indication.

At step 1003, the method 1000 includes identifying a plurality of cells and/or cell nuclei in the plurality of sets of images based on an intensity threshold associated with pixels in the plurality of sets of images. The method includes extracting (or identifying) cell nuclei from the FISH probe images using a first machine learning model (e.g., an automatic image thresholding model, a K-Means clustering model, or Pyramid Mean Shift filtering.) In some implementations, the first machine learning model can generate an intensity threshold (or a set of intensity thresholds) that separate pixels in images into two classes, foreground and background. The method includes extracting the pixels that are classified as foreground and defining these pixels as a cell nuclei. In some implementations, the first machine learning model can generate the threshold(s) using the global histogram of the FISH probe image.

At step 1005, the method 1000 includes applying, for each cell nuclei from the plurality of cell nuclei, a convolutional neural network (CNN) (or a second machine learning model) to each set of images from the plurality of sets of images associated with that cell nuclei. Specifically, the method includes using the CNN to segment pixels in each Z-stack of images of the cell nuclei generated at step 1003. The CNN is configured to predict and determine a binary number of a pixel on the image (e.g., the pixels of the probes can be marked as binary 1 and the background can be marked as a binary 0). The CNN is configured to determine a number of the probes using, for example, connected-components by separating multiple areas with pixels having a binary number of 1. The CNN is configured to identify each area as a probe indication. The probe signals (or pixels) in the same cell nuclei can exhibit variations in their intensities. The probe indications may be present in any of the 21 images of the Z-Stacks. Therefore, the CNN can be configured to process Z-Stack images with spatial and depth invariance. In other words, the CNN is configured to count the number of probe indications considering spatial position and depth from the set of images associated with different focal lengths. In some implementations, the CNN can be based on Convolutional Neural Network but applied to images in three-dimensional (3D U-Net).

The normal expression pattern of the chromosomal DNA can be 2Gr/2R/2A/2G diploid expression. There can be various expression patterns, including gains or deletions of probe indications, that can then be classified, by the CNN, into defined categories (CTC or Non-CTC) used to analyze a cell. In some implementations, the method includes identifying a Circulating Tumor Cell (CTC) as the increase of the probe indications in any two or more channels (of FISH probes). For example, the CNN identifies a CTC based on an expression pattern of 2Gr/2R/4A/4G. The number of Aqua probe indications is four, increased by a number of 2 compared to the expression pattern of a healthy person. Thus, the CNN identifies this cell as a CTC. The number of Green probe indications is also four, increased by a number of 2 compared to the expression pattern of a healthy person. Because one color probe has already increased by a number of 2, the CNN can determine the cell as CTC. CTCs are the target cells and the cells considered most important to diagnosing positive lung cancer. If the CTC count, as identified by the FISH probe detection system or the human expert, exceeds a pre-determined threshold, that patient can be diagnosed positively with lung cancer.

At step 1007, the method includes identifying the sample as containing circulating tumor cells based on the CNN identifying a number of the plurality of probe indications and comparing the number of the plurality of probe indications identified with an expression pattern of chromosomal DNA of a healthy person.

At step 1009, the method includes generating a report indicating the sample as containing the circulating tumor cells.

In some embodiments, each color FISH probe of the four color FISH probes can exhibit different properties (or different characteristic patterns) and have different levels of complexity. Thus, the CNN can be from a set of CNNs and each CNN is trained and used for images associated with a different color FISH probe. Each CNN includes a different architecture for each color FISH probe. In some implementations, the method includes using, for example, Batch Normalization for stabilizing the training and faster convergence, and ReLU non-linearity. In some implementations, the last convolutional layer of the CNN can use sigmoid activation function to produce pixel wise probabilities. Applying different CNNs to images of different color FISH probes can reduce false positives of identifying the probe indication. The false positives can be associated with at least one of a satellite probe indication, a spreading probe indication, or a splitting probe indication.

For example, some known aqua probes can characteristically tend to "spread out" (e.g., a spreading probe indication). In other words, one probe indication of Aqua probes can spread out and looks like multiple probe indications. The CNN for the Aqua probe can segment the discrete components separately. In some implementations, the CNN can be based on a 3D U-Net trained on images depicting aqua probes. In these implementations, the CNN can perform projection from 3D to 2D at the end of the U-Net with a 2D convolutional layer. As another example, some known gold probes can characteristically tend to include satellite probes connected to the parent probe during segmentation (i.e., a satellite probe indication). The CNN for Gold probes can incorporate the characteristics of Gold probes by employing auxiliary branches which perform dilation parallel to the convolution layer. The CNN for Gold probes can perform this operation (i.e., dilation parallel to the convolution layer) more than one sequential layer and a dilation with kernels of multiple sizes can be performed. The convolution layers can then learn to selectively apply dilation of different scales. For another example, images of Red and Green probes can be circular in shape, which can split into two probes (i.e., splitting probe indication). Red and Green probes exhibit similar properties and hence can be modelled with similar CNN models. In these implementations, the CNNs for the Red probes and the Green probes can be based on a 2-dimensional U-Net. The input to the 2D U-Net can be a projection learned by convolution layers at the start of the CNN. The CNN for the Red probes and the Green probes can be configured to perform the projection via two 3D convolution layers with strides of three in the depth dimension.

In some embodiments, a method comprises determining a quantity of cells present in an image, the image is from a plurality of images of a blood sample, each image from the plurality of images taken with a different focal length using a fluorescence microscope. The method includes applying a plurality of convolutional neural networks (CNNs) to each cell depicted in the image, each CNN from the plurality of CNNs configured to identify a different probe indication from a plurality of probe indications, each probe indication from the plurality of probe indications indicating a fluorescence in situ hybridization (FISH) probe selectively binding to a unique location on chromosomal DNA. The method includes identifying a quantity of abnormal cells, each abnormal cell from the plurality of cells containing a different number of locations marked with a probe from the plurality of probes than a normal cell, the normal cell having two locations marked with each probe from the plurality of probes. The method includes identifying a sample depicted in the image as containing circulating lung tumor cells based on at least one of the quantity of abnormal cells or a ratio of abnormal cells to cells present in the image. The method includes generating a report indicating the sample having circulating lung tumor cells.

In some embodiments, the method includes staining the blood sample with DAPI, the quantity of cells in the image determined based on detecting DAPI-stained cell nuclei. The method includes exposing the blood sample to the plurality of probes according to a fluorescence in situ hybridization (FISH) protocol.

In some embodiments, the FISH probe is from a plurality of FISH probes. Each FISH probe from the plurality of FISH probes has a different spectral characteristic. Each CNN from the plurality of CNNs is configured to identify the plurality of probe indications associated with that FISH probe based on its spectral characteristic.

In some embodiments, each CNN from the plurality of CNNs is configured to identify a different probe indication from the plurality of probe indications using, for example, the plurality of images taken with different focal lengths to reduce false positives associated with at least one of a satellite probe indication, a spreading probe indication, or a splitting probe indication.

In some embodiments, a method includes staining a sample with DAPI and capturing a first image of the sample. The method includes identifying a cell in the first image based on a portion of the cell fluorescing from the DAPI. The method includes staining the sample with a plurality of (e.g., FISH) probes, each probe from the plurality of probes configured to selectively bind to a unique location on chromosomal DNA such that a normal cell will be stained in two locations for each probe from the plurality of probes, each probe from the plurality of probes having a different characteristic spectral signature. The method includes capturing a plurality of images of the cell, each image from the plurality of images captured with a different focal length. The method includes applying a plurality of convolutional neural networks (CNN) to the cell, each CNN from the plurality of CNNs configured to identify a different probe from a plurality of probes. The method includes identifying the cell as an abnormal cell based on at least one probe from the plurality of probes appearing once or three times or more in the plurality of images of the cell.

In some embodiments, the method includes identifying the cell in the first image further includes identifying a plurality of cells. The plurality of CNNs are applied to each cell from the plurality of cells.

In some embodiments, each CNN from the plurality of CNNs is a three-dimensional CNN, configured to identify the probe in a three-dimensional volume, each image from the plurality of images representing a different depth.

In some embodiments, the method includes applying a plurality of filters to the plurality of images to produce a plurality of filtered images, each filter from the plurality of filters configured to convert the plurality of images into a plurality of grayscale images associated with different spectral bands, each CNN from the plurality of CNNs applied to a different plurality of filtered images.

In some embodiments, each filter from the plurality of filters is associated with a spectral signature of a probe from the plurality of probes.

In some embodiments, the method includes diagnosing a patient associated with the sample with lung cancer based on the cell being identified as abnormal.

While described herein as using a trained machine learning model to analyze and predict a CTC, in some implementations, any other suitable mathematical model and/or algorithm can be used.

The machine learning models (or other mathematical models) can be trained using supervised learning and unsupervised learning. The machine learning model (or other mathematical models) is trained based on at least one of supervised learning, unsupervised learning, semi-supervised learning, and/or reinforcement learning. In some implementations the supervised learning can include a regression model (e.g., linear regression), in which a target value is found based on independent predictors. This follows that the said model is used to find the relation between a dependent variable and an independent variable. The at least one machine learning model may be any suitable type of machine learning model, including, but not limited to, at least one of a linear regression model, a logistic regression model, a decision tree model, a random forest model, a neural network, a deep neural network, and/or a gradient boosting model. The machine learning model (or other mathematical model) can be software stored in the memory 112 and executed by the processor 111 and/or hardware-based device such as, for example, an ASIC, an FPGA, a CPLD, a PLA, a PLC and/or the like.

Although the disclosure herein has been described with reference to particular embodiments, it is to be understood that these embodiments are merely illustrative of the principles and applications of the present disclosure. Many modifications and variations will be apparent to those skilled in the art. The embodiments have been selected and described in order to best explain the disclosure and its practical implementations/applications, thereby enabling persons skilled in the art to understand the disclosure for various embodiments and with the various changes as are suited to the particular use contemplated. It is therefore to be understood that numerous modifications may be made to the illustrative embodiments and that other arrangements may be devised without departing from the spirit and scope of the present disclosure as defined by the appended claims.

The illustrations of overview of the system as described herein are intended to provide a general understanding of the structure of various embodiments, and they are not intended to serve as a complete description of all the elements and features of apparatus and systems that might make use of the structures described herein. Many other arrangements will be apparent to those skilled in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific figures have been illustrated and described herein, it should be appreciated that any other designs calculated to achieve the same purpose may be substituted for the specific arrangement shown. This disclosure is intended to cover any and all adaptations or variations of various embodiments of the present disclosure. Combinations of the above designs/structural modifications not specifically described herein, will be apparent to those skilled in the art upon reviewing the above description. Therefore, it is intended that the disclosure not be limited to the particular method flow, apparatus, system disclosed as the best mode contemplated for carrying out this disclosure, but that the disclosure will include all embodiments and arrangements falling within the scope of the appended claims.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A non-transitory processor-readable medium storing code representing instructions to be executed by a processor, the code comprising code to cause the processor to:

receive a plurality of three-dimensional (3D) images associated with a sample treated with a plurality of fluorescence probes, each 3D image being associated with a fluorescence probe from the plurality of fluorescence probes, each 3D image comprising a stack of two-dimensional (2D) images, each 2D image being associated with a different focal length of a fluorescence microscope, wherein each fluorescence probe from the plurality of fluorescence probes is configured to selectively bind to a unique location on chromosomal DNA in the sample and wherein each fluorescence probe from the plurality of fluorescence probes has a different characteristic pattern when binding to a respective unique location on chromosomal DNA in the sample;

identify one or more cell nuclei in each 3D image;

apply a convolutional neural network (CNN) to each 3D image to identify probe indications within the identified one or more cell nuclei in each 3D image, wherein the CNN is configured to count the number of probe indications taking into account spatial position and depth from the stack of 2D images associated with different focal lengths, wherein the CNN is one of a plurality of CNNs, the code to cause the processor to apply the CNN further including code to cause the processor to apply a different CNN from the plurality of CNNs for each 3D image comprising a stack of 2D images from the plurality of 3D images, each CNN being trained to detect a characteristic pattern of a fluorescence probe from the plurality of fluorescence probes;

identify the sample as containing circulating tumor cells when a comparison of the identified probe indications and reference probe indications corresponding to an expression pattern associated with chromosomal DNA of a healthy cell deviates by a pre-determined threshold; and generate a report indicating the sample as containing the circulating tumor cells.

2. The non-transitory processor-readable medium of claim 1, wherein the code to identify the one or more cell nuclei further includes code to cause the processor to identify the one or more cell nuclei based on an intensity threshold associated with pixels in the plurality of 3D images.

3. The non-transitory processor-readable medium of claim 1, wherein:

the expression pattern of chromosomal DNA of the healthy cell includes two probe indications for each fluorescence probe from the plurality of fluorescence probes; and the code to identify the sample as containing circulating tumor cells further includes code to cause the processor to identify the sample as containing circulating tumor cells when an output of the CNN indicates a gain of probe indications associated with at least two plurality of fluorescence probes of the plurality of probes.

4. The non-transitory processor-readable medium of claim 1, wherein the code to apply the CNN includes code to cause the processor to:

classify each pixel of each 2D image of each 3D image with a binary number;

segment an area in each 2D image having pixels with similar classifications;

identify the segmented area as a probe indication.

5. The non-transitory processor-readable medium of claim 1, wherein the circulating tumor cells are lung cancer cells.

6. The non-transitory processor-readable medium of claim 1, wherein:

the code to cause the processor to apply the CNN further includes code to cause the processor to: apply a different CNN of the plurality of CNNs for each 3D image.

7. The non-transitory processor-readable medium of claim 1, wherein:

the plurality of CNNs includes a first CNN, a second CNN, and a third CNN, the code to cause the processor to apply the CNN further includes code to cause the processor to:

apply a different CNN from the plurality of CNNs for each 3D image from the plurality of 3D images to reduce false positives, the first CNN configured to detect the probe indications having spreading patterns, the second CNN configured to detect the probe indications having satellite probe patterns, the third CNN configured to detect the probe indications having splitting patterns.

* * * * *